(12) United States Patent
Karr et al.

(10) Patent No.: US 7,739,676 B1
(45) Date of Patent: *Jun. 15, 2010

(54) FUNCTION VALUES IN COMPUTER PROGRAMMING LANGUAGES HAVING DYNAMIC TYPES AND OVERLOADING

(75) Inventors: Michael E. Karr, Brookline, MA (US); Mary Ann Branch, Waltham, MA (US)

(73) Assignee: The Math Works, Inc., Natick, MA (US)

( * ) Notice: Subject to any disclaimer, the term of this patent is extended or adjusted under 35 U.S.C. 154(b) by 1127 days.

This patent is subject to a terminal disclaimer.

(21) Appl. No.: 10/998,069

(22) Filed: Nov. 24, 2004

Related U.S. Application Data (63) Continuation of application No. 09/915,139, filed on Jul. 25, 2001, now Pat. No. 6,857,118.

(51) Int. Cl.
*G06F 9/44* (2006.01)
*G06F 9/45* (2006.01)
(52) U.S. Cl. .................. 717/153; 717/108; 717/116
(58) Field of Classification Search .................. None
See application file for complete search history.

(56) References Cited

U.S. PATENT DOCUMENTS

| | | | |
|---|---|---|---|
| 5,696,974 A * | 12/1997 | Agrawal et al. ............ 717/152 |
| 5,805,887 A | 9/1998 | Wang |
| 6,012,149 A * | 1/2000 | Stavran ........................ 714/2 |
| 6,202,202 B1 * | 3/2001 | Steensgaard ................ 717/127 |
| 6,484,247 B1 * | 11/2002 | Gendron et al. ............ 711/170 |
| 2003/0033589 A1 | 2/2003 | Reyna et al. |
| 2008/0034281 A1 * | 2/2008 | Handsaker et al. .......... 715/219 |

OTHER PUBLICATIONS

Rex E. Gantenbein "Support for Dynamic Binding in Strongly Typed Lanuages", Jun. 1987.*

* cited by examiner

*Primary Examiner*—Tuan Q Dam
*Assistant Examiner*—Isaac T Tecklu
(74) *Attorney, Agent, or Firm*—Lahive & Cockfield, LLP; Kevin J. Canning (57) ABSTRACT

A method and computer program product is shown for use with a computer programming language having dynamic types and overloaded functions. A function data structure (a function handle) is constructed using a function name, which data structure contains or leads to information necessary to resolve function overloading, and also may lead to other auxiliary functions such as write, read or print. Application of the function data structure at the point of construction is functionally equivalent to application of a function name string. However, the function data structure may be applied without regard to the scope at the point of construction.

31 Claims, 2 Drawing Sheets

FUNCTION VALUES IN COMPUTER PROGRAMMING LANGUAGES HAVING DYNAMIC TYPES AND OVERLOADING

TECHNICAL FIELD

This invention relates to computer programming languages having dynamic types and function overloading.

BACKGROUND

When using programming languages, it is often desirable that mathematical functions be able to take as one or more of their arguments a second mathematical function. One example is integration, classically denoted:

$\int_a^b f(x)dx$.

In a pseudo code this may also be written equivalently as:

integral (a, b, $f$)

In the pseudo code example, integral is a function that takes as arguments two numbers (a and b) and a function ($f$). (From elementary integral calculus, we know that integral (a, b, $f$) may not be defined, but if it is defined, it yields a number.)

Programming languages that allow functions as arguments to other functions generally allow functions (called "function values") to be used anywhere that a value can be used—not only as arguments, but also in assignment statements and as components of data structures.

For example, the C programming language has "function pointers" as its function values, and modern LISPs have "closures" as their function values. (A LISP is a LISt Processing language typically used in artificial intelligence applications.) Closures are nested function definitions which can refer to local variables and labels of the function in which they are defined. Unlike the lexical functions provided by some C extensions, closures can be returned from functions and still be called, i.e., they have indefinite extent. A "closure" is a pair consisting of a pointer to a piece of program text (the function pointer) and a lexical context (which specifies the location of names not local to the function and storage locations associated with the names).

The use of functions as arguments to other functions in programming languages goes well beyond the implementation of directly corresponding mathematical functions. For example, graphics systems may associate a function value with each of several possible events. In constructing a window in a windowed environment such as Microsoft® Windows®, a client can specify a mouse-movement function, a separate button-down function for each button, a separate region-entry function for each region, and so on. Uniting the apparently different uses of function values as analogues to mathematical functions and as programmatic devices (as in the graphics example) is the fact that function values permit the writing of more generic functions than would otherwise be possible. Two functions that are similar, but have different sequences of steps in one place, can be captured by a single generic function that takes a function value argument and calls that argument at the place where the two functions had a different sequence of steps. The "different sequence of steps" can be achieved by calling the generic function with different function value arguments.

It is important to distinguish between a function name and an algorithm or rule for performing a computation. "Function" is used herein in the strict mathematical/computer-science sense, i.e., it is an algorithm or rule, not a name. A given function name may be associated with a number of different functions. When a function name appears in a program, the semantics of the programming language must specify how it eventually maps to a particular function. This is often mediated by a type. "Type" is used herein to mean an internal identifier that says how to interpret a value. This definition of "type" embraces both what C and C++ call "type" and also what C++ calls "class," and thus includes both built-in and user definitions of type and class.

Some programming languages allow a name and type work together to specify a function. For example, the same name may be used both for a function whose argument is a floating-point number and for entirely an different function whose argument is an integer. Having a single name to refer to different functions for different types of arguments is an example of what is called "function overloading," even though it might more appropriately be called "function name overloading." We may think of a function name as mapping to a set of functions.

A particular programming language may or may not support function overloading. For example, the C programming language does not support overloading. The type of each variable must be explicitly declared in the source text. Within a given scope (that is, within the set of names that are defined at a particular point in the program), each function name corresponds to at most one function.

Other programming languages, such as the C++ programming language, do support function overloading. Within a given scope, there may be many distinct functions all associated with the same function name. In a language that permits function overloading, the use of a function name in a particular context is potentially ambiguous. To which function does a particular use of a function name refer? Where is the code which implements the particular function? Any language with overloading must be able to resolve these questions. The techniques of resolution for function overloading are called the "overload resolution" rules for the language.

There is an interaction between overload resolution and the type system. In general, the type system is used to resolve the meaning of an overloaded function name, i.e., to choose a particular function from the set of functions to which the name maps. The particulars depend upon the nature of the type system.

Some languages, for example, C++, are "statically typed." In statically typed languages, the types of expressions are fixed by the text of the program. Thus, the compiler can determine the types of arguments of a given function call in the program text, and use those types to pick which, of all the functions in the set to which the name maps, is the one meant by this particular use of the name.

Other languages, for example, the MATLAB® language, are "dynamically typed." In these languages, the types of expressions are not fixed by the program text, and as a consequence, overload resolution is dynamic, meaning that the function that is actually called at run-time for a given function application in the source may vary from one evaluation to the next. Dynamic overload resolution relies upon the fact that, in a dynamically typed language, a value directly or indirectly contains type as well as what we will call "content" of some kind. For instance, the content may be a double precision floating point number, which is interpreted in one way, or a string, which is interpreted in another way.

As an example of the behavior that arises in dynamically typed languages, the body of a program loop may contain a function application in which a particular argument has a value that is an integer at one call, and a floating point number at a later call. The compiler is unable to determine at compile time which type the argument may be, and hence is unable to perform overload resolution at compile time. Put differently, it is the run-time machinery that must resolve the overloading, not the compile-time machinery. Although the time is different, types again figure in the resolution—in this case, types of the values of the arguments during runtime, rather than types of the expressions determined at compile time.

The speed of overload resolution in a dynamically typed language can have a significant effect upon the overall speed executing a program. The more efficient the overload resolution is, the faster the program can be run on a given machine, all other factors being held constant.

SUMMARY

The invention relates to programming languages having dynamic types and overloaded functions.

In one aspect, the invention relates to a method and also to a computer program, in which, at a first point a function name is used to construct a function data structure. The function data structure has information leading to functions having the same function name and which are visible at the first point. At a second point in the program, the method or program product the function data structure may be applied to an argument list, selecting a function using the function data structure and the argument list, and calling the selected function.

In another aspect, the information includes a pointer which leads to native code. In yet another aspect, the information includes information used by the native code. In still another aspect, the information further includes a pointer which leads to native code implementing a top level function. (The terms "pointer" and "leads to" are defined below.) In still another aspect the information includes a pointer which leads to a mapping associating a type with native code implementing a function. In another aspect, the information further includes a pointer leading to a lexical context and a pointer leading to associated native code implementing the function and which code utilizes the lexical context.

In still another aspect, the information includes a pointer leading to interpreter code implementing the function, or may include a pointer which leads to a mapping associating a type with interpreter code for the function, or a pointer leading to a lexical context and an associated a pointer leading to associated interpreter code implementing the function and which uses the lexical context.

The function data construct may include information which leads to the function name or to one or more auxiliary functions, such as copy, delete, print and equal, as well as read and write. Applying the read function causes an absolute filename (defined below) stored during the application of the write function to be matched with a second absolute filename on the current path which has longest common tail (defined below) with the first absolute filename.

In still another aspect, the function data structure includes information used for storage management of the function data structure.

In yet another aspect, the symbol "@" in front of the function name in the computer programming language indicates the point at which the function data structure is to be constructed. In another aspect, the computer programming language function has an feval function (described below).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

The present invention relates to a particular kind of function value, called a "function handle," suitable for a language with dynamic types and overloading. Function handles are more powerful than merely using a string with the function name because they capture all the functions in a particular scope, yet defer function overload resolution to the point of application of the function handle. The present invention provides an efficient implementation of function handles, using a data structure that can be applied to both standalone (native code) and interpreted code.

A function handle holds (or points to, or a combination of both) information to be used in indirect applications of functions. A function handle captures all the information about the one or more functions with a given name. The data structure either contained within the function handle or associated with it (or a combination of both) may contain the name used to construct the function handle, representations of types, and representations of functions. Thus, the types of the values to which the function handle is applied may be used to determine and locate the appropriate function to call. The data structure may also contain pointers to functions in the implementing language. (When used in this application, the term "pointer" includes the concept of a direct pointer, any indirect way (of however many intermediate steps) which ultimately leads to a value, or the value itself. Thus, the term "pointer to x" may mean any of x, a location of x, or an indirect location of x.) A computer language, such as MATLAB, may itself be written in another language, such as C++. In this example, C++ is the implementing language, while MATLAB is the implemented language. The functions in or referred to by the function handle may directly represent functions in the implemented language, or may be solely for the purpose of implementing function handle semantics.

In MATLAB, a function handle is constructed using the "at" sign, @, before the function name. The following example creates a function handle for the "humps" function and assigns it to the variable fhandle.

fhandle=@humps;

(It is not important what the "humps" function does.) The function handle may be passed to another function in the same way a user would pass any argument.

Using the example above, the function handle just created is passed to the function fminbnd, which then finds the value x in the interval [0.3, 1] that minimizes humps(x).

x=fminbnd (fhandle, 0.3, 1)

The fminbnd function calls the @humps function handle using feval, a defined function in the MATLAB language that evaluates the function handle and is discussed in greater detail below. (It is not important to understand what the humps function or fminbnd function themselves do, only that they are defined functions, and that humps becomes part of the function handle that is supplied to fminbnd.) A small portion of the fminbnd function definition file (an M-file in the MATLAB language) is shown below. Line 1 declares the result variables for the function. The funfcn input parameter (line 2) receives the function handle, @humps that was passed in the call. The feval statement, in line 113, applies the function handle to x and the elements of varargin.

1 function [xf, fval, exitflag, output]= . . .
2 fminbnd (funfcn, ax, bx, options, varargin)
. . .
113 fx=feval(funfcn, x, varargin{:});

a function handle may be applied to arguments using the MATLAB feval command. The syntax for using this command with a function handle is feval(fhandle, arg1, arg2, . . . , argn)

where fhandle is the function handle, and arg1, arg2 . . . argn are arguments to which fhandle is to be applied. This acts similarly to an ordinary application of the function name used to construct fhandle, with arguments arg1 through argn. The principal differences are:

i. A function handle can be applied from within any function to which it is passed. The particular function called is drawn from the set of functions contained in or referred to in the function handle. At the point the handle was constructed, these functions were on the path and in scope. (The "path" is a list of directories whose files provide definitions of function names that are eligible to be in scope.) Argument types determine the selection of the called function.

ii. Path and scope are not considered when applying a function handle. The work of initial function lookup is performed when the function handle is constructed. This does not need to be done each time the function handle is applied. Indeed it cannot be done when applying the handle, because scope at the point of application is not the same as the scope at the point the function handle was constructed.

Function handles enable a user to:
i. Pass function access information to other functions
ii. Capture all methods within the scope at the point of function handle construction that overload a function name. (A "method" is a function associated with a particular name and type.)
iii. Allow out-of-scope access to any function.
iv. Ensure reliability when locating the set of functions for a function name
v. Reduce the number of files that are needed to define functions
vi. Improve performance in repeated operations
vii. Store references to functions in any data structure of the language How these features are accomplished is described in greater detail below.

A function handle may be applied even if the function handle's functions are not within the scope of the applying function. This is because the function handle contains or refers to all of the information needed for its application, including pointers to the appropriate functions for different types, which are available regardless of the scope of the function applying the function handle. When applying a function handle, the implementing program language follows the usual rules of selecting which method to call, basing the selection on the types of arguments passed in the function call.

To understand the relationship between function handles and overloading, it is helpful to review the nature of function applications in an exemplary embodiment, in this case MATLAB. Because of overloading, it is useful to think of a single MATLAB function name as comprising a number of functions (for example, built-in code and M-files). In a function application, the choice of which functions is actually called depends upon two factors:

i. The functions that are visible on the path at the time of the call
ii. The types of the arguments to the function at the time of the call.

MATLAB, or more specifically, the feval built-in function of MATLAB, applies function handles in a similar manner. A function handle represents a (perhaps null) collection of methods that overload the function name, together with an optional "default" function that is not a method, i.e., one that is not associated with a type. (We will use the term "top level" for functions that are not methods.) The default function in a function handle, if it exists, is used when none of the methods applies. If no default exists and the required type is not associated with a function, an error is generated. When feval applies a function handle, the choice of the particular function called depends on:

i. The functions contained in or referred to by the function handle
ii. The types of the arguments passed with the handle to the feval command For example, the standard MATLAB path has one function whose name is abs (absolute value), there are three built-in functions whose names are all abs. A function handle created for the abs function contains access information on all four of these functions. If a program written in the MATLAB language applies the abs function to an argument of the type double, then the built-in function that takes a double argument is called. If the argument is of the complex type, then the built-in function that takes an complex argument is executed.

A function handle contains or refers to all visible (i.e., in scope at the point of definition) methods with the desired name, each with its type, and possibly one visible top level function with the desired name. Once constructed, this function handle can be applied repeatedly without incurring the performance delay associated with having to repeat the lookup done in its construction. This can result in improved performance and execution speed.

A language may include nested functions (functions defined within other functions), sub-functions (non-first functions in a file), and private functions. By design, these kinds of functions have limited visibility compared to other functions.

Figure 1:
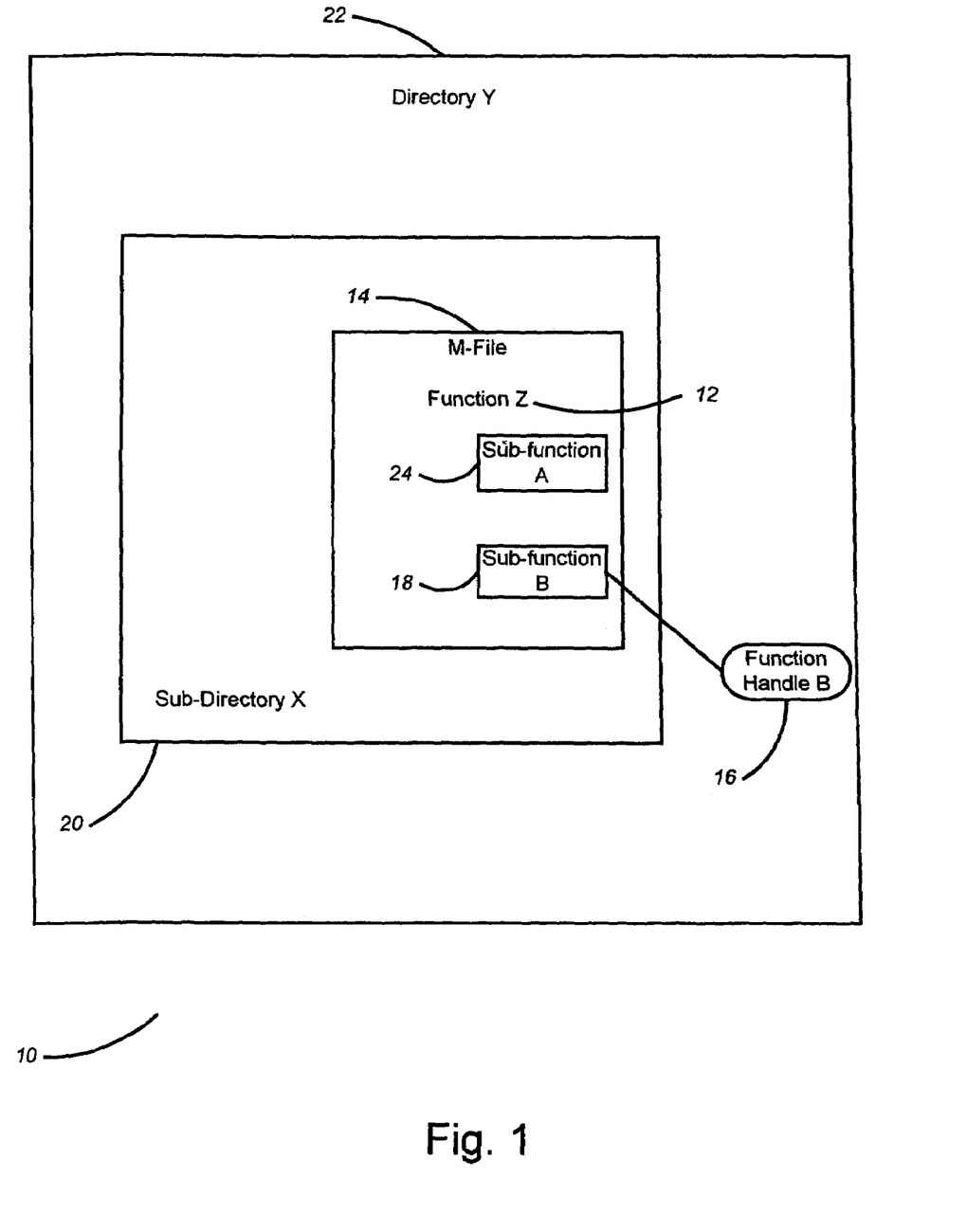
FIG. 1 is a block diagram showing the visibility of function names.

FIG. 1 illustrates visibility rules for sub-functions and the interaction with function handles as implemented in MATLAB. It shows diagram 10, the scope of a function Z 12 defined in an M-File 14, and a function handle 16 which is constructed from a sub-function B 18 within the M-File 14. The function Z uses two sub-functions: A 24 and B 18. The M-File 14 itself is contained within a sub-directory X 20, which is a sub-directory of directory Y 22.

Sub-functions A 24 and B 18 have visibility in only M-File 14. They cannot be called outside of M-File 14. Accordingly, they cannot be called or seen within Directory Y 22 or sub-directory X 20. However: function handle B 16 (constructed within M-File 14) can be applied anywhere, independently of its scope, because the function handle contains within itself all of the necessary information to locate and utilize the function B 18.

A function handle contains or refers to, all the information needed to apply the function handle from any point in the program, independently of the scope at that point. A function handle created for a sub-function while the sub-function is in scope (that is, created from within the file that defines the sub-function), may be passed and applied by a function that resides outside of that file. The same is true for nested and private functions.

Figure 2:
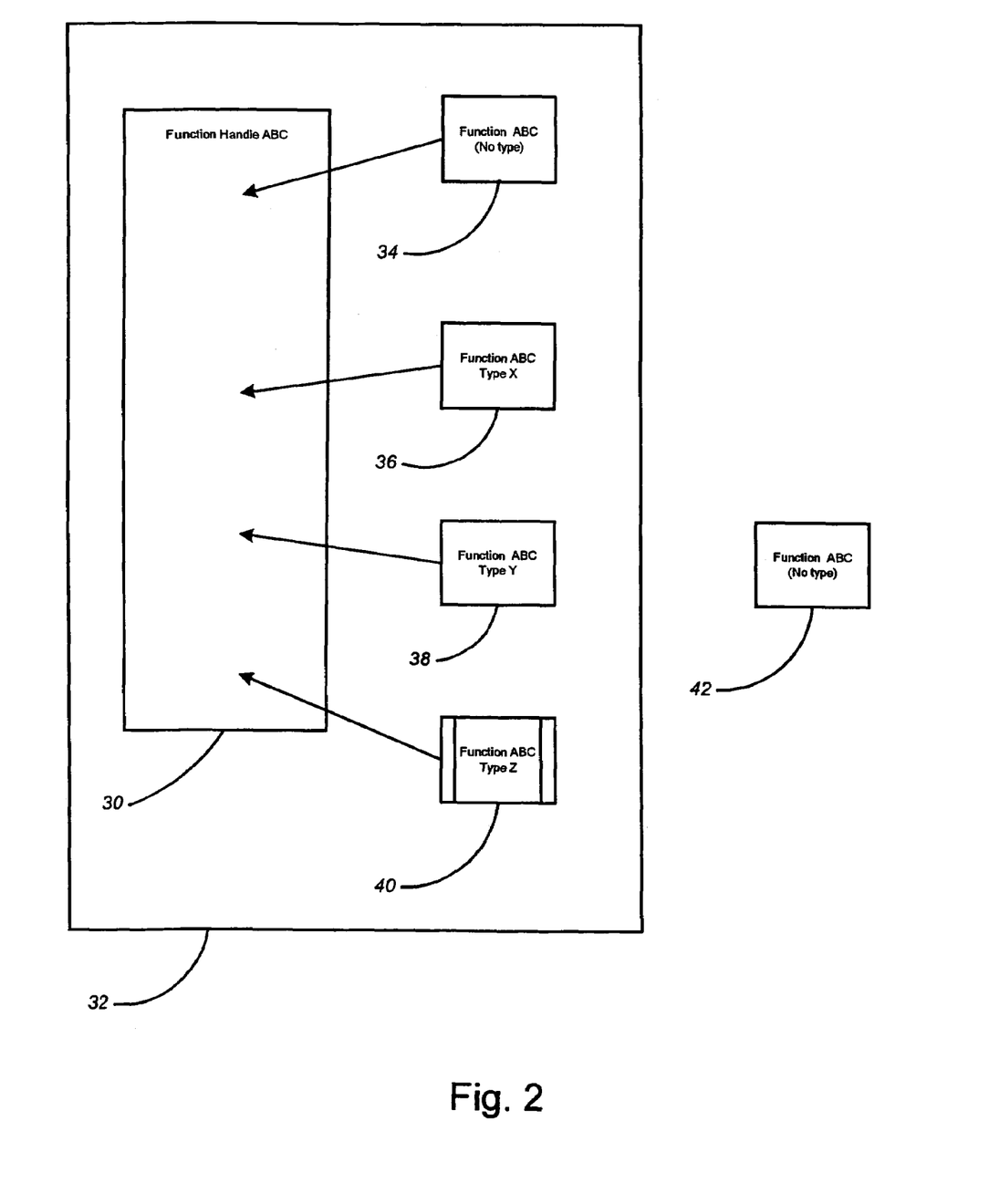
FIG. 2 is a block diagram showing the construction of a function handle.

FIG. 2 illustrates a portion of a function handle that has both a default function and several methods. A function handle ABC 30 is defined for the name ABC. It is not important what the functions with the name ABC do, only that there is at least one function or method with this name. The function handle ABC 30 is constructed in scope 32, within which are various functions written in MATLAB or in the implementing language, all with the name ABC. One of these is the top level function ABC 34, which becomes the default function of the function handle. Three other functions 36, 38 and 40 are methods: function ABC for type X 36, function ABC for type Y 38, and a function in the implementing language, function ABC for type Z 40. The information necessary to utilize the code in functions ABC 34, 36, 38 and 40 is stored in (or pointed to by) function handle 30. (Other storage methods may be used, or combinations of methods, such as having some information stored in the function handle, and a pointer in the function handle to a table constructed to hold other information.)

Note that an apparent ambiguity exists in that there are two top-level functions, ABC 38 and ABC 42. However, at the point of construction of function handle 30, function ABC 42 was outside of scope 32 and hence not visible, and accordingly not used in the construction of function handle 30.

A programmer may use function handles to help reduce the number of function definition files, such as M-files in the MATLAB language, required to define libraries of functions. Absent function handles, a problem with grouping a number of functions in one function definition file such as a MATLAB M-file is that they become defined as sub-functions, with attendant reduced visibility. Using function handles to access these sub-functions removes this limitation. Thus, a programmer may group functions as desired and reduce the number of files that must be managed, assuming that the use of these functions is via handles to them, for example, in function arguments to other functions or as graphics callbacks.

To better understand function handles, it is valuable to understand the program language semantics of the use of a function name in constructing a function handle in relation to its use as the operator of an application.

Consider a programming language that has a function whose arguments are a function value and zero or more trailing arguments and which applies its first argument to the remaining arguments. In MATLAB, and in this discussion, the function is called "feval." (The application feval(fhandle, $x_1, \ldots, x_n$) applies the function handle fhandle to arguments $x_1$ through $x_n$. If the function handle refers to one or more methods, then the types of the arguments $x_1$ through $x_n$ determine at run time which method, if any, is called). Several languages have such a function, and any language with function values conceptually has such a function, which may have some other name. In some languages, feval is implicit, and the application would be written fhandle($x_1, \ldots, x_n$).

A programming language has some syntax for obtaining a function value from a name. In some languages, this might be as simple as the name itself. In MATLAB, and in this discussion, the syntax is the character @ prefixed to the function name. Other implementations may use other syntax to accomplish the same result. The semantics of function application may be decomposed into two parts. The first part is an equivalence between ordinary application (shown on the left below) and the use of the feval function and function value syntax (on the right). Let $f$ denote a function name and args a list of arguments. Then at any point within a program:

$f$(args) is equivalent to feval(@$f$, args)

The second part is that in any application of "feval" to a function handle and arguments, the function that is actually invoked depends only upon the function handle and the types of the arguments, not on the context at the point of invocation.

Taken together, these two parts imply that @$f$ evaluates to a data structure that relates types and one or more functions, only one of which will be used in a particular invocation.

The MATLAB language is an example of an implemented language with function handles. For simplicity in this discussion, we will assume that the implementation language is C and that function values of the implementation language are pointers to native code, and do not have the higher level characteristics of overloading or of closures.

The basic function handle data structure conceptually consists of pairs of values. The column on the left provides a canonical field name for the value; the specific choice of name is inconsequential as is the issue of whether this information is stored directly or indirectly. The column on the right describes its purpose.

TABLE 1

| | |
|---|---|
| f | This is a pointer to a function of the implementation language; it will be used to apply a function handle. |
| x | This is a pointer to a value that is used in connection with the f field above and possibly with certain other functions that will be described below. |

For a given function handle $fh$, we will use $fh.f$ to denote the first component of the pair of constituent values, and $fh.x$ to denote the second component. The representation of a function handle leads directly to the implementation of the constructor for such values:

construct-function-handle($f$, x)

Yield the function handle $fh$ consisting of $f$ and x, i.e., $fh.f=f$ and $fh.x=x$.

Similarly, the implementation of feval is quite generic in its treatment of x:

feval ($fh$, args)

The result is $fh.f$ ($fh.x$, args).

This results in the clean factoring from the variety of possibilities for f and data structures for x, and in the details of those possibilities, as discussed below.

In a practical system, feval is not the only operation that will be performed on function handles. It is necessary at least to copy and delete function handles, and there are a variety of optional functions: print (more generally, output, perhaps in several forms), equality comparison, obtaining a hash code, and so on. An aspect of function handles is that these other functions may be implemented by associating the copy, delete, and optional functions (denoted $aux_1, \ldots, aux_k$ below) with the various possibilities for the f that appears in a function handle. Such an association may take the form of a table in which the columns are named f, copy, delete, print, $aux_1, \ldots, aux_k$, and the rows correspond to particular values for f and its associated functions:

TABLE 2

| f | copy | delete | print | equal | $aux_1$ | ... | aux |
|---|------|--------|-------|-------|---------|-----|-----|
| $f_1$ | $copy_1$ | $delete_1$ | $print_1$ | $equal_1$ | $aux_{11}$ | ... | $aux_{k1}$ |
| $f_2$ | $copy_2$ | $delete_2$ | $print_2$ | $equal_2$ | $aux_{12}$ | ... | $aux_{k2}$ |
| ... | ... | ... | ... | ... | ... | ... | ... |
| $f_n$ | $copy_n$ | $delete_n$ | $print_n$ | $equal_n$ | $aux_{1n}$ | ... | $aux_{kn}$ |

Among the auxiliary functions may be functions that enable the writing of function handles to storage such as hard disk, floppy disk or even communication channels from one computer to another and, conversely, reading function handles from storage. At the time of reading a function handle from storage, the place in the path where a particular function is found may be different than when the function handle was written. For example, the function handle could have been written by one computer and read on another, as in the case of storage using a communications channel. Alternatively, the path on a single computer may have changed from the time the function handle was written to the time it is being read.

There are essentially two kinds of functions used in a programming language: those which are part of the programming language itself (i.e. are built-in to the language) and those that are implemented using the programming language (implemented functions). When a function handle is written to storage, the absolute filename for implemented functions is included. (The "absolute filename" includes the device, zero or more directory names leading to a filename, and the filename itself.) For every built-in function, an indication that it is a built in function is stored.

When a function handle is read in from storage, absolute filenames in the stored function handle must be matched to filenames on the current path as well as may be done. This is done by searching for the filename on the current path that maximizes the common tail between the stored absolute filenames and the filename on the path. "Common tail" means a portion of the absolute filename read right to left. For example, in a stored function handle, there may be an absolute path A:\\dir1\dir2\dir3\dir4\my_function.m. When the function handle is read in from storage, the location of my_function.m may be different, such as D:\\dirA\dirB\dir3\dir4\my_function.m. The common tail is \dir3\dir4\my_function.m. If there were another path E:\\dir5\dir2\dir3\dir4\my_function.m it would have a longer common tail, \dir2\dir\3\dir4\my_function.m.

Among the auxiliary functions may be functions that allow access to different aspects of the information stored in or pointed to by a function handle. These include but are not limited to: the name under which the function handle was constructed; whether a default function is present; the set of types for which the function handle can resolve to a method; for each such type, the absolute file name for the associated method, if it is not a built-in function; and for nested functions, information about the lexical context. The results of the application of such functions may be used by other functions or output to a user.

Below are examples of how the data structure shown in Table 2 may be used in implementation of functions that operate on function handles.

copy-function-handle(fh)
Let i be the index into the above table such that $f_i$=fh.f.
Yield construct-function-handle($f_i$, $copy_i$(fh.x)).
delete-function-handle(fh)
Let i be the index into the above table such that $f_i$=fh.f.
Call $delete_i$(fh.x).
print-function-handle(fh, iochannel)
Let i be the index into the above table such that $f_i$=fh.f.
Call $print_i$(fh.x, iochannel).
equal-function-handle(fh1, fh2)
If fh1.f is not equal to fh2.f, yield false. Otherwise, ...
Let i be the index into the above table such that $f_i$=fh1.f (or fh2.f).
Yield $equal_i$(fh1.x, fh2.x).
$aux_i$-function-handle(fh, ... )
Similarly, as above.

In implementing the function handle concept, there are trade-offs between storing information in a function handle and storing information stored in the table of associated functions. Among the possible approaches are the following:
  i. The function handle may contain only f and x, and all other associations are stored in the table. This is the case outlined above.
  ii. The function handle may contain all the functions contained in a row of the table. This makes the function handle larger, but decreases the time required to invoke a particular function.
  iii. The function handle may contain some of the functions contained in rows of the table, but not others. For example, the MATLAB 6.1 implementation stores the f, copy, and delete functions, but not others.
  iv. The function handle may only contain the index of its row in the table, and x, but contain no other functions. This makes function handles small, and increases feval expense by a little.

Which variants are implemented are engineering choices, and are necessarily accompanied by obvious adjustments to construct-function-handle and all the functions that take function handles as arguments.

Standalone Simple Function Handles

A standalone function handle is a simple case and corresponds to that in which the function handle in the implemented language (e.g., MATLAB) corresponds exactly to a function in the implementation language (e.g., C). Simple as it is, the implementation involves what might seem to be a twist: the x field of a function handle is the pointer to the function in the implementation language. The f field is one of the following functions:
  feval-standalone-simple-function-handle(x, args)
    Yield x(args). (x is, in this case, a function in the implementation language.) Because x is a pointer to a function in the implementation language, it requires no storage management, and the corresponding copy and delete are trivial:
  copy-standalone-simple-function-handle(x)
    Yield x.
  delete-standalone-simple-function-handle(x)
    This is a no-op.

Other functions are less trivial. Examples:
  print-standalone-simple-function-handle(x, iochannel)
    Look up x in a table that translates an implementation function to a string. (The translation involves issues not covered by this invention.)
    Print x to iochannel.
  equal-standalone-simple-function-handle(x1, x2)
    Yield true if x1=x2, and false otherwise.

Other auxiliary functions can be handled similarly.

Standalone General Function Handles

This section describes the connection between function handles and dynamic types. In this case, the x field of a function handle is more complicated than in the previous subsection. Specifically, the x field is a data structure that is summarized in the following diagram.

TABLE 3

| | |
|---|---|
| name | The string that names the function; used in printing and in calling external methods (e.g., Java) |
| count | A reference count, used in storage management. |
| default | A pointer to an implementation function, used if none of the type-specific overloads is relevant. This may be null if there is no such function. |
| overloads | A list of pairs, each consisting of a type (in MATLAB, called a "class") and a non-null pointer to an implementation function. The list may be empty. |

(A reference count is used to remove un-needed material. For example, each time the table is referred to, the reference count could be incremented, while after a time, the count is decremented. If the count goes to zero, the table may be removed from storage. Other methods may be used to similar effect.)

The following functions implement the above structure for the x field of a function handle.

feval-standalone-general-function-handle(x, args)
(i) Use args and x.overloads to determine if there is a type-specific implementation function for this application and, if so, to choose the function (from the second component of some element of x.overloads). The details of this algorithm are not covered by this invention, which is independent of the particular rules used in the determination.
(ii) If the previous step chooses a function g, then execute g(args) and yield the result, if any, as the result of the application of the function handle.
(iii) If the first step did not choose a function, determine whether args allows an external method (e.g., Java) to be used. If so, call that method, supplying x.name and args as the arguments.
(iv) If none of the above cases applies, and if x.default is non-null, then execute x.default(args) and yield the result, if any.
(v) Otherwise, the function handle containing x cannot be successfully applied; issue an error.

copy-standalone-general-function-handle(x)
i. Increment x.count.
ii. Yield x.

delete-standalone-general-function-handle(x)
i. Decrement x.count.
ii. If x.count=0, physically delete x.

print-standalone-general-function-handle(x, iochannel)
Print x.name to iochannel.

equal-standalone-general-function-handle(x1, x2)
i. There are two choices in the implementation of this function. One possibility is that program preparation (e.g., a compiler) ensures that x1 and x2 are canonical. In this case, the result is true if and only if x1=x2. Otherwise, follow the steps below.
ii. If x1.name is not equal to x2.name, yield false.
iii. If x1.default is not equal to x2.default, yield false.
iv. If x1.overloads and x2.overloads have different sets of pairs, yield false.
v. Otherwise, yield true.

Standalone Nested Function Handles

Function handles can be used to represent closures. (Recall from above that a closure is a pair consisting of a pointer to program text and a lexical context.) In this case, the x field of a function handle is the lexical context for the function; the f field itself provides access to native code to implement the function. To make this work, all that is needed is to follow the convention that this function takes a lexical context as its first argument. Having done so, feval itself invokes the f field on the lexical context and the remaining arguments.

The implementation of other functions associated with the "feval" function is easily generated by a program preparation system, e.g., a compiler, and can be placed in the requisite table.

Interpreter Function Handles

Implementation of function handles in which all program text has been compiled to native machine code has been described above, as in the case of a type "pointer to an implementation function" or "pointer to native code." The same ideas can be adapted to a function handle in which the pointer to an implementation function is replaced by a "pointer to an interpreted function." In this scheme, the "pointer to an implementation function" (i.e., the f field) remains just that. It is only in x field that the replacement occurs. This is independent of the method of interpretation; its essence is how the interpretation is begun. One possibility for "pointer to an interpreted function" is a pointer to a data structure that is pseudo-code which is interpreted in the classical way that interpreters work. But "pointer to an interpreted function" is also intended to include the possibility that the "interpreted function" is represented in large part by native code, but involves some levels of indirection between the function handle and the native code. This technique is often employed to incorporate compiled code in otherwise interpreted environments. Thus, "interpreted function" includes both functions represented in ways that are similar to the MathWorks' P-code and IR representations of functions, as well as the "MEX function" representation.

Interpreter Simple Function Handles

This is analogous to standalone simple function handles. In this case, the x field is itself a pointer to an interpreted function. Thus:

feval-interpreted-simple-function-handle(x, args)
Call the interpreter on the interpreted function x and args.
The issues of the storage management of interpreted functions, of printing them, comparing them for equality, and so on, are particular to the interpreter in question, and are not relevant nor covered by this disclosure.

Interpreter General Function Handles

This is analogous to standalone general function handles. In this case the x field is a pointer to a data structure of the kind described in Table 3 above, except that the default and overloads fields of that data structure are pointers to implementation functions, and here are instead pointers to interpreted functions. The analogous representation engenders an analogous implementation as well:

feval-interpreted-general-function-handle(x, args)
Like feval-standalone-general-function-handle, except that "execute g(args) (resp., x.default(args))" is replaced by "call the interpreter on the interpreted function g (resp., x.default) and args."

Interpreter Nested Function Handles

This is analogous to standalone nested function handles. In this case, because the f field of a function handle cannot be a pointer to an interpreted function, the x field must contain a pair consisting of a pointer to the interpreted context and the lexical context that constitute the closure. The f field of the function handle is this:
   feval-interpreted-nested-function-handle(x, args)
   Call the interpreter on the closure x and args.

Printing and equality carry over analogously.

A number of embodiments of the invention have been described. Nevertheless, it will be understood that various modifications may be made without departing from the spirit and scope of the invention. For example, other implemented languages besides MATLAB may beneficially include function handles. Function handles may also be designed into implementing languages. Accordingly, other embodiments are within the scope of the following claims.

What is claimed is:

1. A system for dynamically typing and overloading functions in a programming environment, the system comprising:
   a computer comprising:
      a programming environment, the programming environment utilizing:
         a plurality of functions with a same function name, each of the plurality of functions taking at least one of a different number and type of input arguments, the plurality of functions visible at a first point in a computer program written in a programming language having dynamic types and overloaded functions, the first point being in a first scope of the computer program;
         a function data structure, the function data structure comprising information referencing the plurality of functions with the same function name, the function data structure created at the first point in the computer program; and
         an argument list of input arguments for one of the plurality of functions with the same function name, the function data structure applied to the argument list at a second point in the computer program, the application of the function data structure to the argument list including selecting a function from the plurality of functions and calling the selected function to produce a result, the second point being in a second different scope in the computer program, at least one of the plurality of functions with the same name that are visible in the first scope not being visible in the second scope; and
         a storage, the storage holding the result of the application of the function data structure to the argument list.

2. The system of claim 1 wherein the information further comprises a pointer which leads to native code.

3. The system of claim 2, wherein the information further comprises information used by the native code.

4. The system of claim 1 wherein the information further comprises a pointer which leads to native code which implements a top level function.

5. The system of claim 1 wherein the information further comprises a pointer which leads to a mapping associating a type with native code which implements a function.

6. The system of claim 1, wherein the information further comprises a pointer leading to a lexical context, and further comprises a pointer leading to a native code which implements the function.

7. The system of claim 1, wherein the information further comprises a pointer leading to interpreter code which implements the function.

8. The system of claim 1, wherein the information further comprises a pointer which leads to a mapping associating a type with interpreter code for the function.

9. The system of claim 1, wherein the information further comprises a pointer leading to a lexical context, and further comprises a pointer leading to interpreter code which implements the function.

10. The system of claim 1, wherein the information further comprises information which leads to the function name.

11. The system of claim 1 in which the information further comprises information leading to an auxiliary function.

12. The system of claim 1, wherein the information further comprises information used for storage management of the function data structure.

13. The system of claim 1, wherein the information further comprises a pointer leading to a first auxiliary function, the first auxiliary function applied to the function data structure, a result obtained from the applying.

14. The system of claim 13 wherein the first auxiliary function comprises a write function; and wherein applying the write function causes storing a first absolute filename of a function lead to by the information in the function data structure.

15. The system of claim 13 wherein the information further comprises a pointer leading to a second auxiliary function, and wherein applying the second auxiliary function to the function data structure causes at least a portion of the information contained in or pointed to by the function data structure to be returned as at least one value.

16. The system of claim 1 wherein an identifier in front of the function name in the computer program triggers the creation of the function data structure.

17. The system of claim 16 wherein the identifier is the symbol "@".

18. In a programming environment, a method for dynamically typing and overloading functions, comprising:
   constructing a function data structure that includes information leading to a set of functions having a same function name and visible at a first point in a program written in a computer programming language having dynamic types and overloaded functions, the first point being in a first scope in the program;
   applying the function data structure to an argument list at a second point in the program, the argument list containing input arguments for a selected function from the set of functions, the applying comprising selecting the selected function from the set of functions using the function data structure and calling the selected function to produce a result, the second point being in a second different scope in the program, at least one function in the set of functions that are visible in the first scope not being visible in the second scope; and
   storing the result of the called selected function.

19. The method of claim 18 wherein the information includes a pointer leading to interpreter code which implements the function.

20. In a programming environment, a method for dynamically typing and overloading functions, comprising:
   providing a function handle that includes information leading to a set of functions having a same function name and being visible at a first point in a program written in a computer programming language having dynamic types and overloaded functions, the first point being in a first scope in the program;
   applying the function handle to an argument list of input arguments at a second point in the program, the applying comprising selecting a function from the set of functions using the function handle and calling the selected function to produce a result, the second point being in a second different scope in the program, at least one function in the set of functions that are visible in the first scope not being visible in the second scope; and storing the result of the called selected function.

21. The method of claim 20 wherein the called function is not visible at the second point in the program.

22. The method of claim 20, further comprising:

passing the function handle to another function as an argument.

23. The method of claim 20 wherein the information is one of a direct and indirect pointer to a function.

24. The method of claim 20 wherein the function handle is applied to native code.

25. The method of claim 20 wherein the function handle is applied to interpreted code.

26. The method of claim 20 wherein an identifier in front of a function name in the computer program causes the function handle to be created.

27. The method of claim 26 wherein the identifier is the symbol "@".

28. In a programming environment, a method for dynamically typing and overloading functions, comprising:

providing a function handle that includes information leading to a set of functions, having a same function name and with a first scope in a program written in a computer programming language having dynamic types and overloaded functions;

applying the function handle to an argument list of input arguments at a point in the program wherein the set of functions have a different second scope, the applying comprising selecting a function from the set of functions using the function handle and calling the selected function to produce a result, at least one function in the set of functions that are visible in the first scope not being visible in the second scope; and storing the result of the called selected function.

29. The method of claim 28, further comprising:

passing the function handle to another function as an argument.

30. The method of claim 28 wherein an identifier in front of a function name in the computer program causes the function handle to be created.

31. The method of claim 30 wherein the identifier is the symbol "@".

\* \* \* \* \*

UNITED STATES PATENT AND TRADEMARK OFFICE
CERTIFICATE OF CORRECTION

| | | |
|---|---|---|
| PATENT NO. | : 7,739,676 B1 | Page 1 of 1 |
| APPLICATION NO. | : 10/998069 | |
| DATED | : June 15, 2010 | |
| INVENTOR(S) | : Michael E. Karr et al. | |

It is certified that error appears in the above-identified patent and that said Letters Patent is hereby corrected as shown below:

Title Page, Item (73) Assignee, replace "The Math Works, Inc." with --The MathWorks, Inc.--.

Signed and Sealed this
Twenty-fifth Day of November, 2014

Michelle K. Lee
*Deputy Director of the United States Patent and Trademark Office*